March 30, 1943. K. C. CROFT 2,315,048
FISHING FLOAT
Filed Jan. 10, 1941
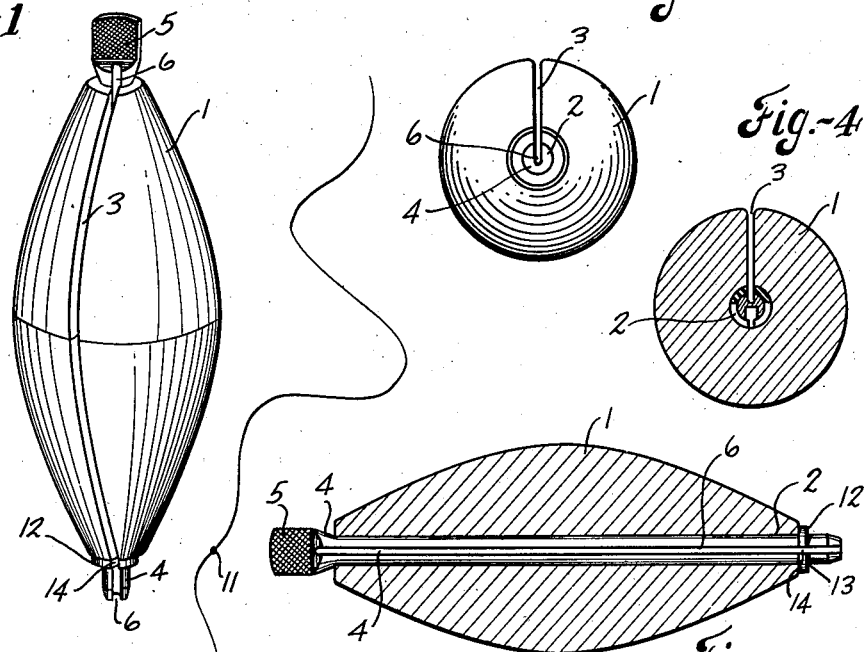
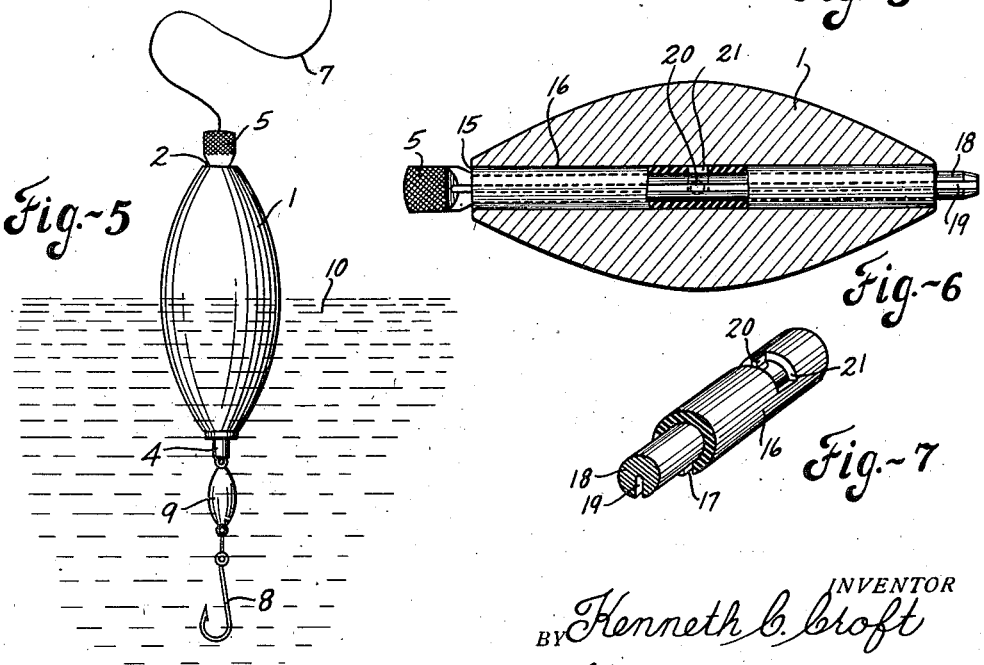
Kenneth C. Croft INVENTOR
C. B. Stevens ATTORNEY Patented Mar. 30, 1943

2,315,048

UNITED STATES PATENT OFFICE 2,315,048

FISHING FLOAT

Kenneth C. Croft, Dayton, Ohio

Application January 10, 1941, Serial No. 373,893

3 Claims. (Cl. 43—49)

This invention pertains to a fishing float and, more particularly, to a float of a character to "run" on a line intermediate spaced stops which may take the form of a fishing hook or weight on the one hand and a stop within the length of the line on the other.

It has long been the practice to have fishing line floats either immovably attached to the line at a depth to hold the hook and bait at a predetermined level above the floor of a stream or lake bed, or to have a float so constructed and arranged that it can be moved along the line to different positions of adjustment by exerting considerable force thereon. However, either type of float lens itself to line casting since the line cannot be drawn into the rod eyes or the reel beyond the positive location of the float on the line. Thus, line casting has been practiced without the use of a float, with the bait or lure either lying on the lake or stream bed, or floating above the bed by reason of its inherent buoyancy which definitely limits the type of lure or bait which may be used.

One object of this invention is to provide a float of the character hereinafter described which is capable of being economically manufactured, which will be efficient in use, economical in operation, automatic in action, having relatively few operating parts, and unlikely to get out of repair.

Another object of this invention is to provide a float of the character hereinafter described which will readily lend itself to line casting wherein the line and lure are drawn in by winding the line on a reel and then cast out into the water.

Another object of this invention is to provide a float of the character hereinafter described which may be readily and easily applied to or removed from a line.

Still another object of the invention is to provide a float which will "run" relatively to the line.

A further object of the invention is to provide a float having the advantageous features and meritorious characteristics herein mentioned.

With the above and other incidental objects in view as will more fully appear in the specification, the invention intended to be protected by Letters Patent consists of the features of construction, the parts and combinations thereof, and the mode of operation, or their equivalents, as hereinafter described and illustrated in the accompanying drawing.

In the drawing wherein is illustrated the preferred but obviously not necessarily the only form of embodiment of the invention, Fig. 1 is an elevational view of a float constructed in accordance with the ideas disclosed by this invention.

Fig. 2 is an end view looking toward the bottom of the float.

Fig. 3 is a longitudinal sectional view of the float.

Fig. 4 is a transverse sectional view taken transversely of the float.

Fig. 5 is a view illustrating the action of the float in water.

Fig. 6 is a longitudinal sectional view of a modified form of float.

Fig. 7 is a fragmentary perspective view of the modified form of line securing means shown in Fig. 6.

Like parts are indicated by similar characters of reference throughout the several views.

Referring to the drawing there is shown a float of the hereinbefore mentioned type which consists of a main body portion 1 which may be of any desired shape or contour and is formed of some buoyant material such, for example, as wood, cork, or balsa wood. The body portion 1 has a central longitudinally extending bore or opening 2 from which a slot 3, disposed also longitudinally of the body 1, extends radially outwardly to the periphery of the body portion.

A pin 4 having a knurled wide-spread end portion 5 and a longitudinally extending groove 6 is adapted to be disposed in the central longitudinally extending bore 2 of the main body portion 1, the fit between the pin and the bore being such that the pin may be rotated in the bore by the exertion of comparatively light twisting force on the knurled wide-spread end 5 of the pin.

In the operation of the float as so far described, the pin 4 is turned in the bore 2 of the main body portion 1 until the groove 6 in the pin registers with the slot 3 in the body portion 1 of the float. Then the line 7 (Fig. 5) is laid in the slot 3 and moved into the groove 6 in the pin. The pin 4 is then rotated to move the groove 6 containing the line 7 out of registry with the slot 3 which effectively locks the line against lateral movement out of the groove 6. It is to be understood that the groove 6 in the pin 4 is of such size relative to the line 7 that the float may move freely along the line length, and in order to limit movement of the float along the line length so that the hook 8 and weight 9 are held at the proper level in the water 10, a knot 11 may be tied in the line at the proper point, it being understood that the knot 11 must be of such size as to prevent passage thereof through the groove 6 in the pin 4. The same effect may be had by winding a thread about the line 7 or attaching some other object to the line which will not pass through the groove 6 in the pin 4 when the groove is out of registry with the slot 3 in the body portion 1 of the float. To remove the float from the line, it is only necessary to reverse the procedure just described.

Thus, there is provided a float which is particularly advantageous for that type of fishing known generally as "casting." That is, when the line is drawn in about the reel the float will follow along the line until it engages the weight 9, the knot or other obstruction 11 being preferably small enough to readily pass through the guiding eyelets of the rod. In "casting," the float provides additional weight at the end of the line, and upon the hook, weight and float striking the water, the line will run through the float under influence of the weight and hook until the knot or other obstruction in the line reaches the top of the float. It will be readily seen that by varying the position of the line knot or obstruction 11 the depth at which the hook hangs suspended in the water may be varied.

While friction between the pin 4 and the bore 2 in the body 1 of the float will ordinarily be sufficient to maintain the pin in the bore, it may be found desirable to otherwise secure the pin in the bore. For example, as shown in Figs. 1, 3 and 5, a split ring 12 may be secured in a peripheral groove 13 in the pin 1 and on that part thereof which extends outwardly from the bottom end of the float with the split 14 in the ring registering with the groove 6 in the pin. However, other methods may be used if desired such, for example, as a key which might extend transversely through the protruding end of the pin 4 in such manner as to prevent the pin from being pulled out of the bore 2.

In Figures 6 and 7 there is shown a modified form of the invention wherein the central longitudinally extending bore 15 of the float body is provided with a tubular insert 16 of some suitable material such as fibre or a plastic material and which tubular insert is secured in the bore by adhesive, by a press fit, or otherwise. The tubular insert 16 has a longitudinally extending slot 17 which registers with the slot 3 in the body portion of the float and is adapted to receive a pin 18 having a longitudinally extending groove 19 similar to the groove 6 in the pin 4. The pin 19 is locked within the tubular insert 16 by a laterally projecting pin 20 which, when the parts are assembled, lays within an opening 21 in the wall of the tubular insert. Such pin 20 prevents removal of the pin 18 from the tubular sleeve 16, and limits rotation of the pin 16 relative to the sleeve. As shown, the laterally projecting pin 20 is preferably placed diametrically opposite the groove 19 whereby the pin may be turned in either direction to move the groove 19 out of registry with the slot 17 in the sleeve and the slot 3 in the float body.

From the above description it will be apparent that there is thus provided a device of the character described possessing the particular features of advantage before enumerated as desirable, but which obviously is susceptible of modification in its form, proportions, detail construction and arrangements of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprises the preferred form of several modes of putting the invention into effect, and the invention is therefore claimed in any of its forms or modifications within the legitimate and valid scope of the appended claims.

Having thus described my invention, what I claim is:

1. A float of the character described, including a body of buoyant material, a central longitudinally extending bore in said body, a slot extending radially from said bore to the periphery of said body, a tubular insert secured in said bore, a longitudinally extending slot in said insert in registry with the slot in said body, a pin rotatably mounted in said insert, and a longitudinally extending groove in said pin adapted to selectively register with the slots in said insert and said body.

2. A float of the character described, including a body of buoyant material, a central longitudinally extending bore in said body, a slot extending radially from said bore to the periphery of said body, a tubular insert secured in said bore, a longitudinally extending slot in said insert in registry with the slot in said body, a pin rotatably mounted in said insert, and a longitudinally extending groove in said pin adapted to selectively register with the slots in said insert and said body, and means for securing said pin against longitudinal movement relative to said insert and said body.

3. A float of the character described, including a body of buoyant material, a central longitudinally extending bore in said body, a slot extending radially from said bore to the periphery of said body, a tubular insert secured in said bore, a longitudinally extending slot in said insert in registry with the slot in said body, a pin rotatably mounted in said insert, and a longitudinally extending groove in said pin adapted to selectively register with the slots in said insert and said body, and means for securing said pin against longitudinal movement relative to said insert and said body, said last named means including an opening in the wall of said sleeve and a laterally projecting ear on said pin.

KENNETH C. CROFT.